(12) United States Patent
Nozoe

(10) Patent No.: US 11,332,855 B2
(45) Date of Patent: May 17, 2022

(54) HEAT RESISTANT REINFORCING CLOTH FOR AIRBAG

(71) Applicant: DOW TORAY CO., LTD., Tokyo (JP)

(72) Inventor: Tsugio Nozoe, Ichihara (JP)

(73) Assignee: DOW TORAY CO., LTD., Toky (JP)

( * ) Notice: Subject to any disclaimer, the term of this patent is extended or adjusted under 35 U.S.C. 154(b) by 15 days.

(21) Appl. No.: 17/082,597

(22) Filed: Oct. 28, 2020

(65) Prior Publication Data

US 2021/0130990 A1 May 6, 2021

(30) Foreign Application Priority Data

Oct. 30, 2019 (JP) .............................. JP2019-197752

(51) Int. Cl.
| | |
|---|---|
| *D03D 1/02* | (2006.01) |
| *D03D 13/00* | (2006.01) |
| *B60R 21/235* | (2006.01) |
| *D06N 3/00* | (2006.01) |
| *D06N 3/12* | (2006.01) |

(52) U.S. Cl.
CPC .............. *D03D 1/02* (2013.01); *B60R 21/235* (2013.01); *D03D 13/008* (2013.01); *D06N 3/0006* (2013.01); *D06N 3/0034* (2013.01); *D06N 3/128* (2013.01); *B60R 2021/23514* (2013.01); *D06N 2201/0263* (2013.01); *D06N 2201/042* (2013.01); *D06N 2203/066* (2013.01); *D06N 2209/067* (2013.01); *Y10T 442/2762* (2015.04)

(58) Field of Classification Search
CPC B60R 2021/23123; B60R 2021/23504; B60R 2021/23514; B60R 21/231; B60R 21/235; D03D 13/008; D03D 15/217; D03D 15/283; D03D 1/02; D10B 2201/02; D10B 2331/02; D10B 2505/124
See application file for complete search history.

(56) References Cited

U.S. PATENT DOCUMENTS

| | | | |
|---|---|---|---|
| 6,250,674 | B1 | 6/2001 | Kreuzer et al. |
| 8,058,190 | B2 | 11/2011 | Sweet et al. |
| 8,475,701 | B2 | 7/2013 | Nozoe |

(Continued)

FOREIGN PATENT DOCUMENTS

| | | |
|---|---|---|
| JP | 2009143383 A | 7/2009 |
| JP | 2018-172103 A | 11/2018 |

(Continued)

OTHER PUBLICATIONS

Machine assisted English translation of JP2018-172103A obtained from https://worldwide.espacenet.com on Oct. 27, 2020, 24 pages.

(Continued)

*Primary Examiner* — Arti Singh-Pandey

(74) *Attorney, Agent, or Firm* — Warner Norcross + Judd LLP

(57) ABSTRACT

A heat resistant reinforcing cloth for an airbag is provided. The heat resistant reinforcing cloth can be disposed on an airbag part which contacts expansion gas in an airbag. The airbag can be deployed and expanded by expansion gas ejected from an inflator. The heat resistant reinforcing cloth comprises: a base fabric of natural fibers selected from the group consisting of cotton, hemp, flax, and combinations thereof; and a silicone rubber layer on both sides of the base fabric.

6 Claims, 1 Drawing Sheet

(56) References Cited

U.S. PATENT DOCUMENTS

| | | | |
|---|---|---|---|
| 8,962,498 B2* | 2/2015 | Yamamoto | C09D 183/04 442/157 |
| 9,062,411 B2 | 6/2015 | Nozoe et al. | |
| 2009/0312475 A1* | 12/2009 | Tasaki | C08L 83/04 524/425 |
| 2010/0190396 A1 | 7/2010 | Nozoe et al. | |
| 2012/0288649 A1 | 11/2012 | Blackwood et al. | |
| 2015/0266264 A1 | 9/2015 | Lowe et al. | |
| 2015/0267344 A1 | 9/2015 | Blackwood et al. | |
| 2016/0152206 A1 | 6/2016 | Tosa | |
| 2019/0092969 A1 | 3/2019 | Akitomo et al. | |
| 2020/0070764 A1* | 3/2020 | Ashida | D06N 3/128 |

FOREIGN PATENT DOCUMENTS

| | | | | |
|---|---|---|---|---|
| JP | 6737394 B2 * | 8/2020 | | B01J 31/12 |
| WO | 2011162900 A1 | 12/2011 | | |

OTHER PUBLICATIONS

Machine assisted English translation of JP2009143383A obtained from https://patents.google.com/patent on Mar. 2, 2022, 4 pages.

* cited by examiner

HEAT RESISTANT REINFORCING CLOTH FOR AIRBAG

CROSS-REFERENCE TO RELATED APPLICATIONS

This application claims priority to and all advantages of Japanese Patent Application No. 2019-197752 filed on 30 Oct. 2019, the content of which is incorporated herein by reference.

TECHNICAL FIELD

The present invention relates to a heat resistant reinforcing cloth for an airbag, and particularly relates to a heat resistant reinforcing cloth for an airbag for protecting a gas inflow part of an airbag from high-temperature, high-pressure gas ejected by an inflator.

BACKGROUND ART

An airbag device includes an inflator that ejects expansion gas, along with an airbag which is deployed and expanded by the expansion gas. The expansion gas ejected from the inflator is a high-temperature, high-pressure gas that is 500° C. or higher, while the main body cloth part configuring the outer shell part of the airbag is generally a fabric made from polyamide fibers and polyester fibers, problematically resulting in a case in which the high-temperature, high-pressure expansion gas instantaneously melts and carbonizes the main body cloth part, in turn leading to the generation of holes due to the melting of the expansion gas at high temperatures and the scattering of the carbonized part caused by the pressure thereof.

Therefore, in some airbags, by overlapping multiple reinforcing cloths made from the same raw material as the main body cloth part on the inner surface of the main body cloth part which is susceptible to the heat of the expansion gas, the heat of the expansion gas is prevented from reaching the main body cloth part, thereby suppressing holes from being opened in the main body cloth part. Unfortunately, as the number of sheets of reinforcing cloth increases, it becomes difficult to suture the reinforcing cloth to the main body. Moreover, as the number of sheets of reinforcing cloth increases, the airbag becomes less likely to fold, the weight thereof increases, and the bulk (when the airbag is folded) increases, problematically leading to lowered mountability.

Therefore, Patent Document 1 proposes a heat resistant reinforcing cloth for an airbag, wherein at least one of the airbag members contacted by the expansion gas is a member to be reinforced, and the heat resistant reinforcing cloth reinforces the heat resistance of the member to be reinforced and includes: a base fabric which is formed by cotton fibers and disposed between the member to be reinforced and the gas jet; a heat resistant layer made from aluminum foil laminated on the surface of the base fabric on the gas jet side; and a top coat layer made from a resin film laminated on the surface of the heat resistant layer on the gas jet part side.

Unfortunately, the heat resistant reinforcing cloth which laminates the aluminum foil problematically has low flexibility, limiting the method for housing an airbag.

PRIOR ART DOCUMENTS

Patent Documents

Patent Document 1: Japanese Unexamined Patent Application Publication No. 2018-172103

SUMMARY OF THE INVENTION

Problems to be Solved by the Invention

An object of the present invention is to provide a heat resistant reinforcing cloth for an airbag having excellent flexibility for protecting a gas inflow part of an airbag from high-temperature, high-pressure gas ejected by an inflator.

Means for Solving the Problems

A heat resistant reinforcing cloth for an airbag according to the present invention is a heat resistant reinforcing cloth disposed on an airbag part which contacts expansion gas in an airbag, with the airbag deployed and expanded by the expansion gas ejected from an inflator, wherein the reinforcing cloth includes: a base fabric of natural fibers selected from cotton, hemp, and/or flax; and a silicone rubber layer on both sides of the base fabric.

The base fabric is preferably a plain woven fabric, wherein a fabric density of the base fabric is preferably at least 35 strands/inch of warps and at least 35 strands/inch of wefts.

A total adhesion amount of the silicone rubber layer is preferably 300 g/m$^2$ or less, and the silicone rubber layer is preferably formed from a silicone rubber composition such that, when the silicone rubber composition is applied to a nylon woven fabric for an airbag, an application amount thereof is 35 g/m$^2$ or less, and a combustion speed thereof in combustion test FMVSS No. 302 is 80 mm/min or less. Such a silicone rubber composition preferably comprises:

(A) 100 parts by mass of a diorganopolysiloxane having at least two alkenyl groups per molecule;
(B) 5 to 100 parts by mass of an organopolysiloxane resin and/or inorganic filler;
(C) an organopolysiloxane having at least two silicon atom-bonded hydrogen atoms per molecule, in an amount such that the silicon atom-bonded hydrogen atoms in this component are 0.6 to 20 moles with respect to 1 mole of a total of alkenyl groups in components (A) and (B); and
(D) a catalyst amount of a hydrosilylation reaction catalyst.

Effects of the Invention

The heat resistant reinforcing cloth for an airbag according to the present invention can protect the gas inflow part of the airbag from high-temperature, high-pressure gas ejected by the inflator and has excellent flexibility, such that there is no limit in terms of the mode in which the airbag is housed.

DETAILED DESCRIPTION OF THE INVENTION

Figure 1:
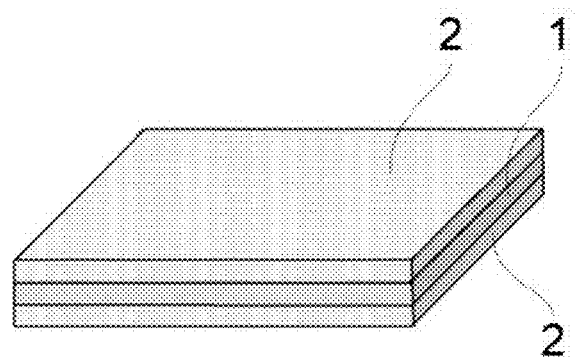
FIG. 1 is a cross sectional view of a heat resistant reinforcing cloth for an airbag having a silicone rubber layer on both surfaces, which is an embodiment of the present invention.

As illustrated in FIG. 1, the heat resistant reinforcing cloth for an airbag according to the present invention includes: a base fabric 1 of natural fibers selected from cotton, hemp, and/or flax; and a silicone rubber layer 2 on both sides of the base fabric 1. When such a heat resistant reinforcing cloth is a heat resistant reinforcing cloth disposed on an airbag part which contacts expansion gas in an airbag, with the airbag deployed and expanded by the expansion gas ejected from the inflator, the heat of the expansion gas is prevented from reaching the airbag main body cloth part, suppressing the generation of holes in the main body cloth part, and further not impairing the flexibility of the airbag, thereby preventing the airbag from decreasing the folding properties.

This is because the point of carbonization of the natural fibers selected from cotton, hemp, and/or flax forming the base fabric of the heat resistant reinforcing cloth is as high as 500° C. to 580° C., which is higher than the melting point of polyamide fibers or polyester fibers used in the fabric of the airbag, and the cloth does not melt due to the heat of the expansion gas, making the generation of holes less likely.

Moreover, because the heat resistant reinforcing cloth has a silicone rubber layer on both sides of the base fabric, the high-temperature expansion gas is restricted from passing therethrough and directly touching the base fabric, thereby suppressing the heat of the expansion gas from being transferred to the base fabric. Moreover, because the silicone rubber layer is mechanically bonded to the base fabric of the heat resistant reinforcing cloth due to the anchoring effect, a phenomenon in which the silicone rubber layer separates from the base fabric when the airbag is deployed and expanded is suppressed, while also suppressing the dispersive rupturing thereof due to the pressure of the expansion gas. While the heat resistant reinforcing cloth can be disposed on the airbag on its own, two or more heat resistant reinforcing cloths may be disposed on the airbag by overlapping, as long as the flexibility of the airbag is not impaired.

In the abovementioned heat resistant reinforcing cloth, the base fabric is preferably made from a plain woven fabric. This plain woven fabric is woven with the warps and wefts alternately crossed, thereby yielding more crossed points of warps and wefts than other woven tissues, for example, fabrics woven by twill weave and satin weave, while increasing the strength such as tensile strength and tear strength. In addition, there is little difference in strength between the arrangement direction of the warps and that of the wefts. Consequently, an effect of compensating the strength of the silicone rubber layer is similarly obtained as in the arrangement direction of the warps and that of the wefts. In particular, a fabric density thereof is preferably at least 35 strands/inch of warps and at least 35 strands/inch of wefts. Moreover, while not limited thereto, a total fiber degree of the thread is preferably within the range of 100 to 2,000 dtex.

In the abovementioned heat resistant reinforcing cloth, while the thickness of the silicone rubber layer is not particularly limited, a total adhesion amount thereof is preferably 300 g/m$^2$ or less. A silicone rubber layer with such a coating weight can ensure the necessary heat resistance without impairing the flexibility of the heat resistant reinforcing cloth.

A silicone rubber composition is preferable as a silicone rubber composition for forming such a silicone rubber layer, such that when the silicone rubber composition is applied to a nylon woven fabric for an airbag, an application amount thereof is preferably 35 g/m$^2$ or less. Herein, a combustion speed thereof in combustion test FMVSS No. 302 is preferably 80 mm/min. or less. The curing mechanism of such a silicone rubber composition is not limited, with examples thereof including addition reactions, condensation reactions, radical reactions by organic peroxides, radical reactions by UV irradiation, etc., with curing by addition reactions preferable because curing is rapidly carried out at relatively low temperatures. For example, such a silicone rubber composition preferably comprises:

(A) 100 parts by mass of a diorganopolysiloxane having at least two alkenyl groups per molecule;
(B) 5 to 100 parts by mass of an organopolysiloxane resin and/or inorganic filler;
(C) an organopolysiloxane having at least two silicon atom-bonded hydrogen atoms per molecule, in an amount such that the silicon atom-bonded hydrogen atoms in this component are 0.6 to 20 moles with respect to 1 mole of a total of alkenyl groups in components (A) and (B); and
(D) a catalyst amount of a catalyst for a hydrosilylation reaction.

Component (A) is a diorganopolysiloxane having at least two alkenyl groups per molecule. Exemplary alkenyl groups in component (A) include alkenyl groups having 2 to 12 carbon atoms such as vinyl groups, allyl groups, butenyl groups, pentenyl groups, hexenyl groups, with vinyl groups preferable. Moreover, exemplary silicon atom-bonded organic groups other than alkenyl groups in component (A) include: alkyl groups having 1 to 12 carbon atoms such as methyl groups, ethyl groups, and propyl groups; aryl groups having 6 to 12 carbon atoms such as phenyl groups, tolyl groups, and xylyl groups; and halogenated alkyl groups having 1 to 12 carbon atoms such as 3-chloropropyl groups and 3,3,3-trifluoropropyl groups, with methyl groups and phenyl groups preferable.

Component (A) is a substantially linear organopolysiloxane, but may also have a branched structure at a portion of the molecular chain. Moreover, while not limited thereto, the viscosity of component (A) is preferably within the range of 100 to 100,000 mPa·s, or within the range of 1,000 to 50,000 mPa·s. This is due to the fact that if the viscosity of component (A) is the lower limit of the aforementioned range or higher, the mechanical properties of the silicone rubber layer obtained will be enhanced; in contrast, if the viscosity is the upper limit of the aforementioned range or lower, the coatability of the silicone rubber composition obtained will be enhanced. Note that the viscosity of component (A) can be measured by a rotational viscometer in accordance with JIS K7117-1.

Exemplary diorganopolysiloxanes of component (A) include a dimethylpolysiloxane blocked with dimethylvinylsiloxy groups at both molecular chain terminals, a dimethylsiloxane/methylvinylsiloxane copolymer blocked with dimethylvinylsiloxy groups at both molecular chain terminals, a dimethylsiloxane/methylphenylsiloxane copolymer blocked with dimethylvinylsiloxy groups at both molecular chain terminals, and methyl(3,3,3-trifluoropropyl)siloxane/methylvinylsiloxane copolymer blocked with dimethylvinylsiloxy groups at both molecular chain terminals.

Component (B) is an organopolysiloxane resin for improving the mechanical strength of the silicone rubber layer and improving the penetration and adhesion of the heat resistant reinforcing cloth to the base fabric, or an inorganic filler which is blended to adjust the viscosity of the composition, improving the mechanical strength, heat resistance, or flame retardancy of the silicone rubber layer. The organopolysiloxane resin of component (B) has a resinous molecular structure, that is, it is an organopolysiloxane, the main components of which include a siloxane of Q units represented by the formula: $SiO_{4/2}$ or a siloxane of T units represented by the formula: $RSiO_{3/2}$, wherein other siloxane units may have a siloxane in D units represented by the formula: $R_2SiO_{2/2}$, along with a siloxane in M units represented by the formula: $R_3SiO_{1/2}$. In the formula, R represents the same or different monovalent hydrocarbon groups having 1 to 12 carbon atoms, with specific examples thereof including: alkyl groups having 1 to 12 carbon atoms such as methyl groups, ethyl groups, and propyl groups; alkenyl groups having 2 to 12 carbon atoms such as vinyl groups, allyl groups, butenyl groups, pentenyl groups, and hexenyl groups; aryl groups having 6 to 12 carbon atoms such as phenyl groups, tolyl groups, and xylyl groups; and halogenated aralkyl groups having 1 to 12 carbon atoms such as 3-chloropropyl groups and 3,3,3-trifluoropropyl groups, with methyl groups, vinyl groups, and phenyl groups preferable. In terms of further improvements in the mechanical strength of the silicone rubber layer, the organopolysiloxane resin of component (B) preferably has alkenyl groups in the molecule.

Exemplary organopolysiloxane resins of component (B) include: resins consisting of $(CH_3)_3SiO_{1/2}$ units and $SiO_{4/2}$ units; resins consisting of $(CH_3)_3SiO_{1/2}$ units, $(CH_2=CH)SiO_{3/2}$ units, and $SiO_{4/2}$ units; resins consisting of $(CH_2=CH)(CH_3)_2SiO_{1/2}$ units and $SiO_{4/2}$ units; and resins consisting of $(CH_2=CH)(CH_3)_2SiO_{1/2}$ units and $(CH_2=CH)SiO_{3/2}$ units, and $SiO_{4/2}$ units. Moreover, the organopolysiloxane resin is a liquid at room temperature but preferably is compatible with component (A) even in solid form.

In contrast, well-known inorganic fillers of component (B) can be used, with specific examples including: fine powdery silica fillers such as fumed silica, precipitated silica, and burned silica; reinforcing fillers such as fumed titanium oxide; non-reinforcing fillers such as crushed quartz, diatomaceous earth, iron oxide, titanium oxide, aluminum oxide, aluminum hydroxide, calcium carbonate, magnesium carbonate, and magnesium hydroxide; and those in which these fillers are treated with an organosilicon compound such as an organosilane and organopolysiloxane. Of these, an ultrafine powdery silica having a specific surface area of 50 $m^2/g$ or more is preferable. Of these, surface treated ultrafine powdery silica, for example, silica that has been surface treated in advance with organosilanes, organosilazanes, diorganocyclopolysiloxane, etc. is further suitable.

In order to improve the penetration to the base fabric while simultaneously improving thin film coatability, the content of component (B) is within the range of 5 to 100 parts by mass, preferably within the range of 10 to 80 parts by mass, with respect to 100 parts by mass of component (A). Moreover, when the ultrafine powdery silica is used as component (B), the content thereof is preferably within the range of 5 to 15 parts by mass with respect to 100 parts by mass of component (A). This is because if the content of the fine powdery silica exceeds 15 parts by mass, the viscosity of the abovementioned composition is too high and coating the base fabric without a solvent becomes difficult; in contrast, if the content of the fine powdery silica is less than 5 parts by mass, the mechanical strength of the silicone rubber layer decreases.

Component (C) is a crosslinking agent for the abovementioned composition and is an organopolysiloxane having at least two silicon atom-bonded hydrogen atoms per molecule. Moreover, exemplary silicon atom-bonded organic groups other than hydrogen atoms in component (C) include: alkyl groups having 1 to 12 carbon atoms such as methyl groups, ethyl groups, and propyl groups; aryl groups having 6 to 12 carbon atoms such as phenyl groups, tolyl groups, and xylyl groups; and halogenated alkyl groups having 1 to 12 carbon atoms such as 3-chloropropyl groups and 3,3,3-trifluoropropyl groups, with methyl groups and phenyl groups preferable.

While not particularly limited thereto, exemplary molecular structures of component (C) include a linear structure, branched structure, partially branched linear structure, cyclic structure, and resinous structure. Moreover, while not limited thereto, a kinematic viscosity at 25° C. of component (C) is preferably within the range of 1 to 1,000 $mm^2/s$. This is due to the fact that if the viscosity of component (C) is the lower limit of the aforementioned range or higher, the mechanical properties of the silicone rubber layer obtained will be enhanced; in contrast, if the viscosity is the upper limit of the aforementioned range or lower, the coatability of the silicone rubber composition obtained will be enhanced. Note that the viscosity of component (C) can be measured by an Ubbelohde type viscometer in accordance with JIS Z8803.

Exemplary organopolysiloxanes of component (C) include a methylhydrogenpolysiloxane blocked with trimethylsiloxy groups at both molecular chain terminals, a dimethylsiloxane/methylhydrogensiloxane copolymer blocked with trimethylsiloxy groups at both molecular chain terminals, a methylphenylsiloxane/methylhydrogensiloxane copolymer blocked with dimethylphenylsiloxy groups at both molecular chain terminals, a cyclic methylhydrogenpolysiloxane, and a copolymer consisting of dimethylhydrogensiloxy units and $SiO_{4/2}$ units.

The content of component (C) is an amount such that the silicon atom-bonded hydrogen atoms in this organopolysiloxane are within the range of 0.6 to 20 moles with respect to 1 mole of a total of alkenyl groups in components (A) and (B), and is preferably an amount within the range of 1 to 15 moles, or within the range of 1 to 10 moles.

Component (D) is a hydrosilylation reaction catalyst for curing the abovementioned composition. Exemplary such components (D) include platinum fine powder, platinum black, chloroplatinic acid, platinum tetrachloride, olefin complexes of chloroplatinic acid, alcohol solutions of chloroplatinic acid, and complex compounds of chloroplatinic acid and alkenylsiloxanes, along with rhodium compounds and palladium compounds.

The content of component (D) is a catalytic amount, wherein the amount of a catalyst metal in component (D) is within the range of 0.1 to 500 parts by mass, preferably within the range of 1 to 50 parts by mass, with respect to 1 million parts by mass of component (A). This is because, if the amount is less than 0.1 parts by mass, the reaction does not sufficiently proceed; while an amount exceeding 500 parts by mass is uneconomical.

The abovementioned composition may contain an epoxy group-containing organosilicon compound (E) as another optional component. Exemplary such components (E) include: epoxy group-containing organoalkoxysilanes such as γ-glycidoxypropyl trimethoxysilane and β-(3,4-epoxycyclohexyl)ethyl trimethoxysilane; and epoxy group-containing organopolysiloxanes such as an epoxy group-containing organopolysiloxane having vinyl groups and alkoxy groups bonded to silicon atoms, an epoxy group-containing organopolysiloxane having silicon atom-bonded hydrogen atoms, and an epoxy group-containing organopolysiloxane having silicon atom-bonded hydrogen atoms and alkoxy groups.

Moreover, the abovementioned composition may contain an organic titanium compound (F) as another optional component. Exemplary such components (F) include: organic titanate esters such as tetraisopropyl titanate, tetrabutyl titanate, and tetraoctyl titanate; and titanium chelate compounds such as diisopropoxy bis(acetylacetonate) titanium, and diisopropoxy bis(ethyl acetoacetate) titanium. The content of component (F) is within the range of 0.1 to 5 parts by mass with respect to 100 parts by mass of component (A). This is because, if the content of component (F) exceeds 5 parts by mass, the storage stability of the abovementioned composition will be deteriorated; whereas, if the content is less than 0.1 parts by mass, the effect of reducing the adhesion of the surface of the silicone rubber layer surface is not exerted.

Moreover, the abovementioned composition may contain a curing retardant (G) as another optional component. Exemplary such components (G) include: alkyne alcohols such as 3-methyl-1-butyn-3-ol, 3,5-dimethyl-1-hexyn-3-ol, and phenyl butynol; enyne compounds such as 3-methyl-3-penten-1-yne and 3,5-dimethyl-3-hexen-1-yne; and tetramethyltetrahexenylcyclotetrasiloxane, and benzotriazole. The content of component (G) is generally within the range of 0.01 to 10 parts by mass with respect to 100 parts by mass of component (A).

The method for preparing such a silicone rubber composition is not limited and the composition can be easily manufactured by uniformly kneading in a mixer such as a kneader mixer, pressure kneader mixer, or Ross mixer.

The composition can be coated on a base fabric, placed in a hot air drying furnace, and heated and cured to form a heat resistant reinforcing cloth having a silicone rubber layer. Because the heat resistant reinforcing cloth has low surface tackiness, the adhesion to the main body cloth part of the airbag is poor and the heat resistant reinforcing cloth has excellent processability upon stitching, etc. without applying dusting powder such as talc and calcium carbonate onto the surface thereof, in addition to the adherence of the main body cloth parts together during folding storage also being less problematic.

Figure 2:
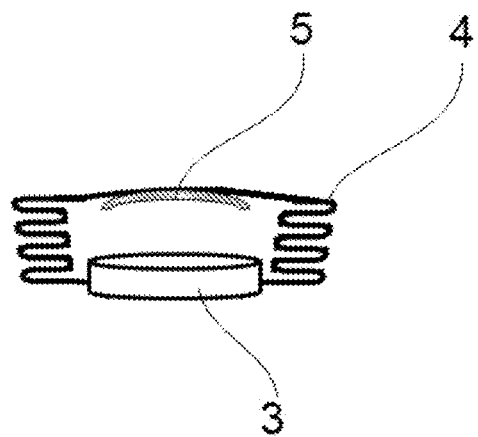
FIG. 2 is a cross sectional view illustrating the housed state of the airbag in which the heat resistant reinforcing cloth for an airbag according to the present invention is disposed.
Figure 3:
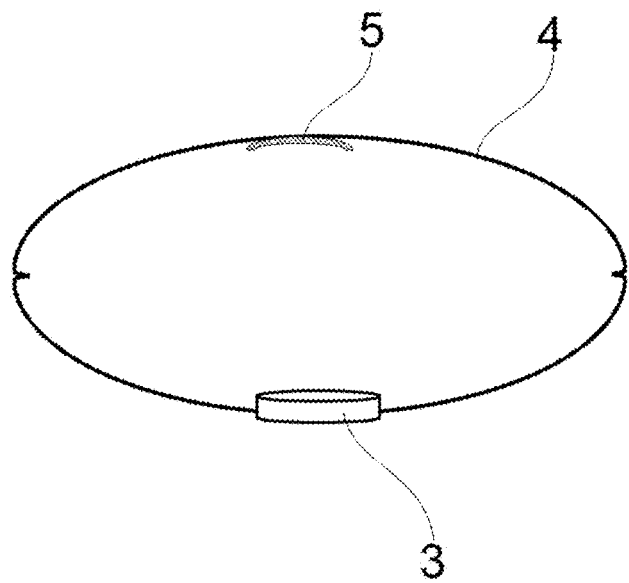
FIG. 3 is a cross sectional view illustrating the deployed state of the airbag in which the heat resistant reinforcing cloth for an airbag according to the present invention is disposed.

Next, embodiments in which a heat resistant reinforcing cloth for an airbag according to the present invention is used for an airbag will be described with reference to FIGS. 2 and 3. However, the heat resistant reinforcing cloth for an airbag according to the present invention is not limited to the embodiment illustrated in FIGS. 2 and 3. Note that FIG. 2 is a cross sectional view illustrating the housed state of the airbag in which the heat resistant reinforcing cloth for an airbag according to the present invention is disposed. In contrast, FIG. 3 is a cross sectional view illustrating the state in which this airbag is deployed.

Exemplary inflators 3 include a disc type inflator, wherein the end of the main body cloth part 4 of the airbag is attached to the main body part of the inflator 3, and wherein a gas generating agent (not illustrated) inside the inflator 3 causes the main body cloth part 4 of the airbag to be deployed and expanded. With the inflator 3 not actuated, the main body cloth part 4 of the airbag is folded and housed in a handle, a front panel, or a side pillar.

Moreover, multiple gas jets (not illustrated) are provided in the inflator 3 such that the airbag can be rapidly deployed with the expansion gas.

The main body cloth part 4 of the airbag is formed from a woven fabric which is woven using polyamide fibers or polyester fibers, which are raw materials having high strength and flexibility.

The heat resistant reinforcing cloth 5 for an airbag according to the present invention can be used for: the position which comes in contact with the expansion gas ejected from the inflator 3; the position which comes in contact with the inflator 3 when the main body cloth part 4 of the airbag is folded in FIG. 3; and an inner bag for rectifying the expansion gas ejected from the inflator 3. The thickness of this heat resistant reinforcing cloth 5 is not limited, however, in order to not reduce the foldability of the main body base fabric of the airbag, the thickness is preferably from 5 μm to 30 μm.

The following examples are intended to illustrate and not to limit the invention.

EXAMPLES

The heat resistant reinforcing cloth for an airbag according to the present invention will be described in detail with reference to examples. Note that the viscosity (Pa·s or mPa·s) in the examples is the value at 25° C. measured using a rotary viscometer conforming to JIS K7117-1, while the kinematic viscosity ($mm^2/s$) is the value at 25° C. measured with an Ubbelohde viscometer conforming to JIS Z8803.

<FMVSS No. 302 Test>

The heat resistant reinforcing cloth was cut into a rectangular shape having a length of 10 cm and a width of 25 cm, after which this was used as a test piece. The combustion speed (mm/min.) was determined by the method in accordance with the prescribed method in combustion test FMVSS No. 302 (Federal Motor Vehicle Safety Standards No. 302) of the automobile interior material. The case in which the combustion speed was 80 mm/min. or less was regarded as a "pass," while the case in which it exceeded 80 mm/min. was regarded as a "fail." Note that when the silicone rubber layer was provided on only one side, the silicone rubber layer was tested so as to be on the flame contact side.

<Presence of Holes Formed by Flame>

From the lower side of the horizontally held test sample, a Bunsen burner with the height of the flame adjusted to 38 mm was brought into contact with flame for two minutes from the position in which the tip position of the Bunsen burner was 30 mm from the test sample, after which it was visually observed as to whether holes were formed on the front side by the flame.

<Iron Ball Drop Test>

After the abovementioned test, when there was no hole formed by flame, the Bunsen burner was immediately removed and an 8.7 g iron ball was dropped from a height of 50 mm from the silicone rubber layer to the center of the flame contact part. The case in which the iron ball did not pass therethrough was regarded as a "pass," while the case in which it passed therethrough was regarded as a "fail."

Reference Example 1

100 parts by mass of a dimethylpolysiloxane blocked with dimethylvinylsiloxy groups at both molecular chain terminals and having a viscosity of 2,000 mPa·s, along with 30 parts by mass of a methylvinylpolysiloxane resin (vinyl group content=5.6 mass %) consisting of $(CH_3)_2(CH_2=CH)SiO_{1/2}$ units and $SiO_{4/2}$ units and having a viscosity of 230 mPa·s was placed in a Ross mixer. Next, 12 parts by mass of fumed silica having a BET specific surface area of 200 m$^2$/g, 5 parts by mass of hexamethyldisilazane as a surface treatment agent of silica, and 2 parts by mass of water were added thereto so as to be uniformly mixed, and then heat treatment was performed under a vacuum to prepare a silicone rubber base having fluidity.

Next, with respect to 100 parts by mass of this silicone rubber base, 10 parts by mass of an organopolysiloxane having a kinematic viscosity of 5 mm$^2$/s and represented by the average molecular formula:

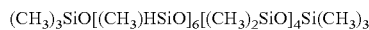

$(CH_3)_3SiO[(CH_3)HSiO]_6[(CH_3)_2SiO]_4Si(CH_3)_3$ (an amount in which the amount of silicon atom-bonded hydrogen atoms in this organopolysiloxane is 1.4 moles with respect to 1 mole of a total of vinyl groups in the abovementioned silicone rubber base), 0.5 parts by mass of a complex of chloroplatinic acid and divinyltetramethyldisiloxane (platinum content=0.4 mass %), 0.4 parts by mass of 3,5-dimethyl-1-hexyn-3-ol as a curing inhibitor, 1 part by mass of γ-glycidoxypropyl trimethoxysilane as an adhesion imparting agent, 0.5 parts by mass of a tetrabutyl titanate as an anti-tack agent, and 25 parts by mass of magnesium hydroxide (MAGSEEDS S, manufactured by Konoshima Chemical Co., Ltd.) were uniformly mixed to prepare a silicone rubber composition (1) having a viscosity of 32 Pa·s.

When the silicone rubber composition was applied to a nylon woven fabric for an airbag (warps/wefts=46/46, 470 dtex), the application amount thereof was 10 to 15 g/m$^2$, wherein the combustion speed thereof in an FMVSS No. 302 was 80 mm/min. or less.

Reference Example 2

100 parts by mass of a dimethylpolysiloxane blocked with dimethylvinylsiloxy groups at both molecular chain terminals and having a viscosity of 2,000 mPa·s, along with 30 parts by mass of a methylvinylpolysiloxane resin (vinyl group content=1.9 mass %) consisting of $(CH_3)_2(CH_2=CH)SiO_{1/2}$ units, $(CH_3)_3SiO_{1/2}$ units, and $SiO_{4/2}$ units, which were solid at room temperature, was placed in a Ross mixer. Next, 12 parts by mass of fumed silica having a BET specific surface area of 200 m$^2$/g, 5 parts by mass of hexamethyldisilazane as a surface treatment agent of fumed silica, and 2 parts by mass of water were added thereto so as to be uniformly mixed, and then heat treatment was performed under a vacuum to prepare a silicone rubber base having fluidity.

Next, added to 100 parts by mass of this silicone rubber base were: 0.5 parts by mass of a complex of chloroplatinic acid and divinyltetramethyldisiloxane (platinum content=0.4 mass %); 0.4 parts by mass of 3,5-dimethyl-1-hexyn-3-ol; 1 part by mass of γ-glycidoxypropyl trimethoxysilane; 1 part by mass of ethyl polysilicate having a kinematic viscosity of 5 mm$^2$/s (SiO$_2$ content=40 mass %); and 0.5 parts by mass of tetrabutyl titanate, which were then uniformly mixed, after which 8 parts by mass of an organopolysiloxane having a kinematic viscosity of 5 mm$^2$/s and represented by the average molecular formula:

$(CH_3)_3SiO[(CH_3)HSiO]_6[(CH_3)_2SiO]_4Si(CH_3)_3$ (in an amount such that the amount of silicon atom-bonded hydrogen atoms in the organopolysiloxane was 2.8 moles with respect to 1 mole of a total of vinyl groups in the silicone rubber base) were then uniformly mixed to prepare a silicone rubber composition (2) having a viscosity of 26 Pa·s.

When the silicone rubber composition was applied to a nylon woven fabric for an airbag (warps/wefts=46/46, 470 dtex), the application amount thereof was 15 to 20 g/m$^2$, wherein the combustion speed thereof in an FMVSS No. 302 was 80 mm/min. or less.

Reference Example 3

100 parts by mass of a dimethylpolysiloxane blocked with dimethylvinylsiloxy groups at both molecular chain terminals and having a viscosity of 40 Pa·s, 60 parts by mass of wet silica (NIPSIL LP produced by Tosoh Silica Corporation), 9.7 parts by mass of hexamethyldisilazane, 4.4 parts by mass of water, and 0.7 parts by mass of a dimethylsiloxane/methylvinylsiloxane copolymer blocked with dimethylhydroxysiloxy groups at both molecular chain terminals and having a viscosity of 20 mPa·s (content of vinyl groups=approximately 10.9 mass %) were added into a Ross mixer, uniformly mixed at room temperature, and then heat treatment was performed at 200° C. for two hours under reduced pressure to prepare a silicone rubber base having fluidity.

Next, added to 53 parts by mass of this silicone rubber base were: 40 parts by mass of a dimethylpolysiloxane blocked with dimethylvinylsiloxy groups at both molecular chain terminals and having a viscosity of 40 Pa·s; 0.1 parts by mass of a cyclic methylvinylsiloxy having a kinematic viscosity of 3.5 mm$^2$/s; 4.3 parts by mass of a dimethylsiloxane/methylhydrogensiloxane copolymer blocked with trimethylsiloxy groups at both molecular chain terminals and having a kinematic viscosity of 5.5 mm$^2$/s (an amount in which the silicon atom-bonded hydrogen atoms in the abovementioned organopolysiloxane was 6.5 moles with respect to 1 mole of a total of vinyl groups in the abovementioned silicone rubber base); 0.15 parts by mass of a 1,3-divinyltetramethyldisiloxane solution of a 1,3-divinyltetramethyldisiloxane complex of platinum (platinum content=0.4 mass %); and 2 parts by mass of a mixture of 2 parts by mass of ethynylcyclohexanol and 98 parts by mass of a dimethylpolysiloxane blocked with dimethylvinylsiloxy groups at both molecular chain terminals and having a viscosity of 10 Pa·s, which were then uniformly mixed to prepare a silicone rubber composition having a viscosity of 128 Pa·s.

When the silicone rubber composition was applied to a nylon woven fabric for an airbag (warps/wefts=46/46, 470 dtex), the application amount thereof was 30 to 35 g/m$^2$, wherein the combustion speed thereof in an FMVSS No. 302 was 80 mm/min. or less.

Examples 1 to 5 and Comparative Examples 1 to 6

The silicone rubber composition prepared in Reference Examples 1 to 3 was applied to the base fabrics in the indicated coating amounts listed in Tables 1 and 2, then cured by heating for two minutes at 180° C. Here, the method for coating the woven fabric was carried out by uniformly coating the liquid silicone rubber composition without unevenness using a knife coater, then heating and curing the composition in an oven at 180° C. for two minutes to produce a heat resistant reinforcing cloth having a silicone rubber layer. In the case of double coating, the application amount of both surfaces was adjusted to approximately the same amount. These base fabrics were subjected to FMVSS No. 302 testing, checking for the presence of holes formed by flame, and the iron ball drop test, with the results indicated in Tables 1 and 2.

TABLE 1

|  | Examples | | | | |
| --- | --- | --- | --- | --- | --- |
|  | 1 | 2 | 3 | 4 | 5 |
| Type of base fabric | Cotton | Hemp | Cotton | Hemp | Cotton |
| Fabric density (strands/ Warps inch) of the base fabric Wefts | 64 | 36 | 64 | 36 | 46 |
|  | 64 | 36 | 64 | 36 | 49 |
| Total fiber degree (dtex) of the thread | 347 | 1042 | 347 | 1042 | 289 |
| Type of Silicone Rubber Composition | (1) | (1) | (2) | (3) | (1) |
| Total adhesion amount ($g/m^2$) of the silicone rubber composition | 160 | 160 | 180 | 220 | 280 |
| Adhesion surface of the silicone rubber | Both sides | Both sides | Both sides | Both sides | Both sides |
| Overlapping number | 1 | 1 | 2 | 1 | 1 |
| FMVSS No. 302 test | Pass | Pass | Pass | Pass | Pass |
| Presence of holes formed by flame | None | None | None | None | None |
| Iron ball drop test | Pass | Pass | Pass | Pass | Pass |

TABLE 2

|  | Comparative Examples | | | | | |
| --- | --- | --- | --- | --- | --- | --- |
|  | 1 | 2 | 3 | 4 | 5 | 6 |
| Type of base fabric | Ny-lon66 | Ny-lon66 | Ny-lon66 | Ny-lon66 | Cotton | Hemp |
| Fabric density    Warps (strands/inch)    Wefts of the base fabric | 46 | 46 | 46 | 46 | 64 | 36 |
|  | 46 | 46 | 46 | 46 | 64 | 36 |
| Total fiber degree (dtex) of the thread | 470 | 470 | 470 | 470 | 347 | 1042 |
| Type of Silicone Rubber Composition | (1) | (1) | (1) | (1) | (2) | (1) |
| Total adhesion amount ($g/m^2$) of the silicone rubber composition | 300 | 160 | 200 | 400 | 125 | 140 |
| Adhesion surface of the silicone rubber | One side | Both sides | Both sides | Both sides | One side | One side |
| Overlapping number | 1 | 1 | 1 | 1 | 1 | 1 |
| FMVSS No. 302 test | Pass | Pass | Pass | Pass | Fail | Fail |
| Presence of holes formed by flame | None | Present | None | None | Present | None |
| Iron ball drop test | Fail | — | Fail | Fail | — | Fail |

INDUSTRIAL APPLICABILITY

The heat resistant reinforcing cloth for an airbag according to the present invention can protect the gas inflow part of the airbag from high-temperature, high-pressure gas ejected by the inflator and has excellent flexibility, enabling use as a heat resistant reinforcing cloth for various types of airbags.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

REFERENCE NUMERALS

1: Base fabric of natural fibers
2: Silicone rubber layer
3: Inflator
4: Main body cloth part of the airbag
5: Heat resistant reinforcing cloth

What is claimed is:

1. A heat resistant reinforcing cloth for an airbag, which is a heat resistant reinforcing cloth disposed on an airbag part which contacts expansion gas in an airbag, with the airbag deployed and expanded by the expansion gas ejected from an inflator, wherein the reinforcing cloth comprises:
 a base fabric of natural fibers selected from the group consisting of cotton, hemp, flax, and combinations thereof; and
 a silicone rubber layer on both sides of the base fabric.

2. The heat resistant reinforcing cloth according to claim 1, wherein the base fabric is a plain woven fabric.

3. The heat resistant reinforcing cloth according to claim 2, wherein a fabric density of the base fabric is at least 35 strands/inch of warps and at least 35 strands/inch of wefts.

4. The heat resistant reinforcing cloth according to claim 1, wherein a total adhesion amount of the silicone rubber layer is 300 $g/m^2$ or less.

5. The heat resistant reinforcing fabric according to claim 1, wherein the silicone rubber layer is formed from a silicone rubber composition comprising:
 (A) 100 parts by mass of a diorganopolysiloxane having at least two alkenyl groups per molecule;
 (B) 5 to 100 parts by mass of an organopolysiloxane resin and/or inorganic filler;
 (C) an organopolysiloxane having at least two silicon atom-bonded hydrogen atoms per molecule, in an amount such that the silicon atom-bonded hydrogen atoms in this component are 0.6 to 20 moles with respect to 1 mole of a total of alkenyl groups in components (A) and (B); and
 (D) a catalyst amount of a hydrosilylation reaction catalyst.

6. An airbag comprising the heat resistant reinforcing cloth according to claim 1.

* * * * *